United States Patent
Paredes et al.

(10) Patent No.: US 10,965,495 B2
(45) Date of Patent: Mar. 30, 2021

(54) VIRTUALIZED CONNECTIVITY IN A CLOUD SERVICES ENVIRONMENT

(71) Applicant: LEVEL 3 COMMUNICATIONS, LLC, Broomfield, CO (US)

(72) Inventors: Salvador Paredes, Broomfield, CO (US); Nasser Nabih El-Aawar, Denver, CO (US); Gary Randall Ratterree, Louisville, CO (US); Todd James Williamson, Denver, CO (US); Ted Wagner, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/629,436

(22) Filed: Jun. 21, 2017

(65) Prior Publication Data

US 2017/0288906 A1    Oct. 5, 2017

Related U.S. Application Data

(63) Continuation of application No. 13/310,589, filed on Dec. 2, 2011, now abandoned.

(60) Provisional application No. 61/419,797, filed on Dec. 3, 2010.

(51) Int. Cl.
| | |
|---|---|
| *H04L 12/16* | (2006.01) |
| *H04L 12/46* | (2006.01) |
| *H04L 29/06* | (2006.01) |
| *H04L 29/12* | (2006.01) |

(52) U.S. Cl.
CPC ...... *H04L 12/4641* (2013.01); *H04L 63/0272* (2013.01); *H04L 61/2514* (2013.01)

(58) Field of Classification Search
CPC ........................................................ H04L 12/46
USPC ........................................................ 709/225
See application file for complete search history.

(56) References Cited

U.S. PATENT DOCUMENTS

| | | | |
|---|---|---|---|
| 7,369,540 B1 | 5/2008 | Giroti | |
| 2003/0223406 A1 | 12/2003 | Balay et al. | |
| 2006/0050719 A1* | 3/2006 | Barr | H04L 45/00 370/401 |
| 2008/0049752 A1* | 2/2008 | Grant | H04L 12/4641 370/392 |
| 2008/0181219 A1* | 7/2008 | Chen | H04L 12/4641 370/389 |
| 2009/0037607 A1 | 2/2009 | Farinacci et al. | |

(Continued)

OTHER PUBLICATIONS

Canadian Examination Report, dated Aug. 17, 201, Application No. 2,819,545, filed Dec. 2, 2011; 5 pgs.

(Continued)

*Primary Examiner* — Sibte H Bukhari

(57) ABSTRACT

A system and method of providing virtualized connectivity in a cloud services environment. A service provider network defines at least a first virtual private network and a second virtual private network for a respective first customer network and a second customer network. The service provider network includes at least one physical connection with a cloud services provider network where the at least one physical connection includes a first private virtual connection between the first virtual private network and the cloud services provider and a second private virtual connection between the second virtual private network and the cloud services provider.

15 Claims, 13 Drawing Sheets

(56) References Cited

U.S. PATENT DOCUMENTS

| | | | |
|---|---|---|---|
| 2009/0097490 A1 | 4/2009 | Sanderson et al. | |
| 2010/0027552 A1 | 2/2010 | Hill | |
| 2011/0075667 A1* | 3/2011 | Li | H04L 12/4633 370/392 |
| 2011/0274111 A1* | 11/2011 | Narasappa | H04L 12/4633 370/392 |
| 2012/0151057 A1 | 6/2012 | Paredes et al. | |

OTHER PUBLICATIONS

European Examination Report, dated Feb. 28, 2018, Application No. 11845214.3, filed Dec. 2, 2011; 6 pgs.
Canadian Examination Report, dated Sep. 4, 2018, Application No. 2,819,545, filed Dec. 2, 2011; 3 pgs.
European Examination Report, dated Feb. 1, 2019, Application No. 11845214.3, filed Dec. 2, 2011; 3 pgs.
European Examination Report, dated Apr. 26, 2016, Application No. 11845214.3, filed Dec. 2, 2011; 6 pgs.
Extended European Search Report, dated Aug. 19, 2015, Application No. 11845214.3, filed Dec. 2, 2011; 7 pgs.
International Preliminary Report on Patentability, dated Jun. 4, 2013, Int'l Appl. No. PCT/US11/063161, Int'l Filing Date Dec. 2, 2011, 6 pgs.
International Search Report, Intl Appl. No. PCT/US11/63161, Intl Filing Date Dec. 2, 2011, 3 pgs.
Written Opinion, Intl Appl. No. PCT/US11/63161, Intl Filing Date Dec. 2, 2011, 4 pgs.
European Examination Report, dated Jul. 19, 2017, Application No. 11845214.3, filed Dec. 2, 2011; 10 pgs.
Hao, Fang et al., "Secure Cloud Computing with a Virtualized Network Infrastructure", USENIX, XP061009962 May 27, 2010, pp. 1-7.
Ranjan, Rajiv et al., "Peer-to-Peer Cloud Provisioning: Service Discovery and Load-Balancing", ARXIV.org, Cornell Univ. Library, Ithaca, NY 14853; XP080381624 Dec. 10, 2009, pp. 1-27.
Wood, Timothy et al., "The Case for Enterprise-Ready Virtual Private Clouds", USENIX; XP061008891 May 29, 2009, pp. 1-5.

* cited by examiner

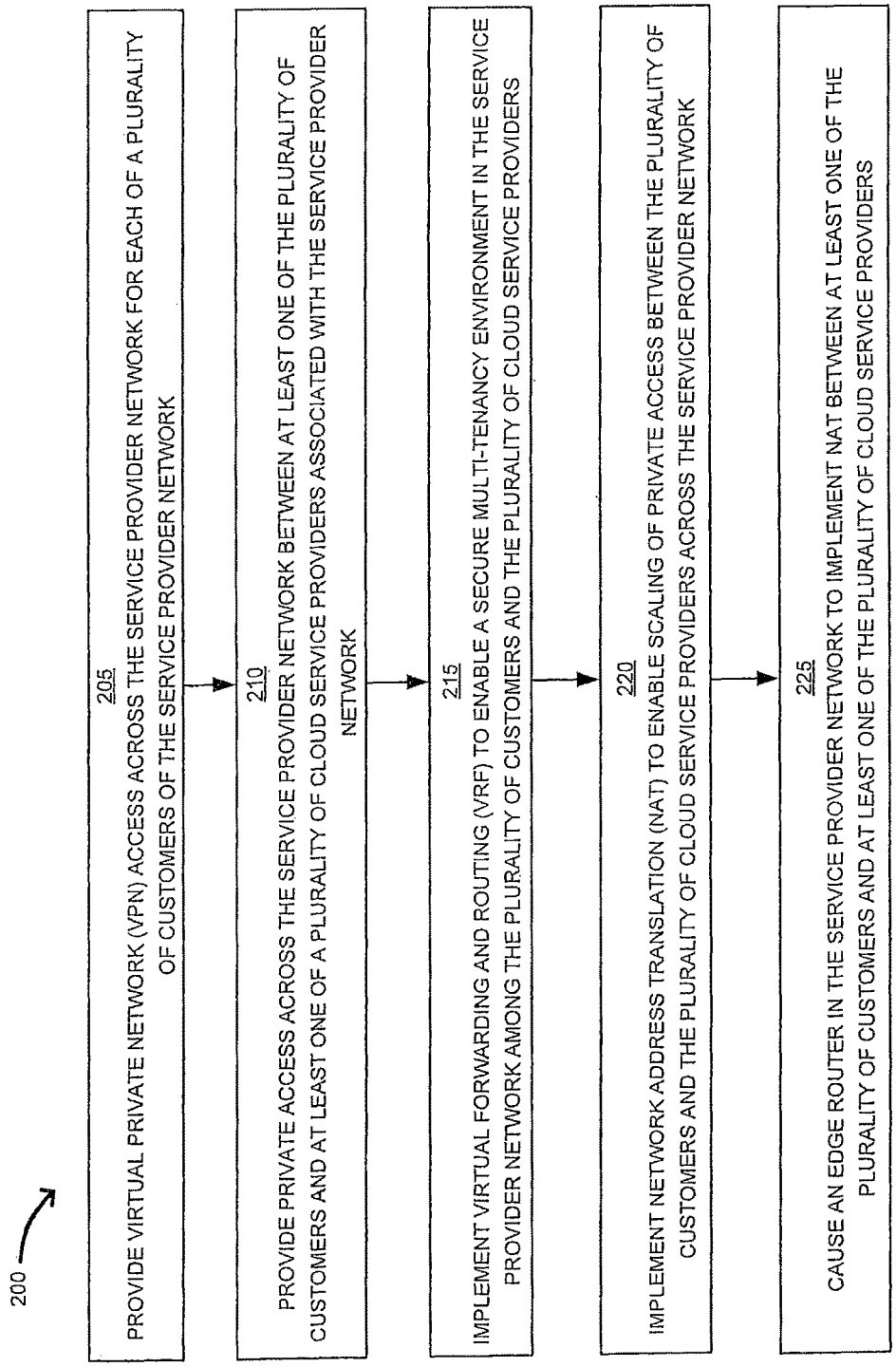

VIRTUALIZED CONNECTIVITY IN A CLOUD SERVICES ENVIRONMENT

CROSS REFERENCE TO RELATED APPLICATIONS

This application is a continuation of and claims the benefit of priority to U.S. patent application Ser. No. 13/310,589, entitled "VIRTUALIZED CONNECTIVITY IN A CLOUD SERVICES ENVIRONMENT," filed Dec. 2, 2011, the entire contents of which are fully incorporate by reference herein for all purposes. Application Ser. No. 13/310,589 claims priority under 35 U.S.C. § 119(e) to U.S. Provisional Application No. 61/419,797, entitled "PRIVATE DELIVEYR OF LOCALIZED CLOUD SERVICES," filed Dec. 3, 2010, the entire contents of which are fully incorporated by reference herein for all purposes.

TECHNICAL FIELD

Embodiments presently disclosed generally relate to network communications. More specifically, embodiments herein relate to the private delivery of virtualized cloud services.

BACKGROUND

Cloud computing generally involves network-based virtualization of computing resources that are shared over a public network such as the Internet. Some example paradigms of cloud computing include Software as a Service (SaaS), Platform as a Service (PaaS), and Infrastructure as a Service (Iaas), whereby computing applications/software, computing platforms, and computing infrastructures, respectively, are provided as a service to an end user from one or more computing resources that are remotely located across a network (i.e., in the cloud).

For example, a cloud services provider may make a service, platform or infrastructure from one or more data centers available to one or more customers over the Internet. Due to the scalability and flexibility that public networks offer, conventional cloud computing architectures utilize public networks (e.g., the Internet) as the medium for providing and sharing virtualized computing resources (e.g., SaaS, PaaS, IaaS, etc.). Many customers, however, do not want to use a public network to access the cloud services, due in part to the insecurity of public networks, so a private circuit or line is purchased to provide private access to the cloud services. Cloud providers, in turn, are often challenged with provisioning and managing all of the private physical connections to its data centers and services requested by customers.

Although more secure than public networks, private networks do not provide a scalable and efficient virtualization environment for implementing cloud computing. As such, there is a need for both a secure and scalable networking environment in which to implement a cloud computing architecture. It is with these issues in mind, among others, that various aspects of the present disclosure were conceived and developed.

SUMMARY

One aspect of the present disclosure involves a computer-implemented method for providing virtualized cloud services across a service provider network, the computer-implemented method involving providing virtual private network (VPN) access across a service provider network for each of a plurality of customers of the service provider network. The method further involves providing private access across the service provider network between at least one of the plurality of customers and at least one of a plurality of cloud service providers associated with the service provider network, the private access being over a shared physical connection between the service provider network and the at least one of the plurality of cloud providers.

Another aspect of the present disclosure involves a system of providing virtualized connectivity in a cloud services environment. A service provider network defines at least a first virtual private network and a second virtual private network for a respective first customer network and a second customer network. The service provider network includes at least one physical connection with a cloud services provider network where the at least one physical connection includes a first private virtual connection between the first virtual private network and the cloud services provider and a second private virtual connection between the second virtual private network and the cloud services provider.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 13 is a flow chart that shows processing operations performed in accordance with an example embodiment.

Throughout the drawing figures, like reference numerals will be understood to refer to like parts and components.

DETAILED DESCRIPTION

Figure 1:
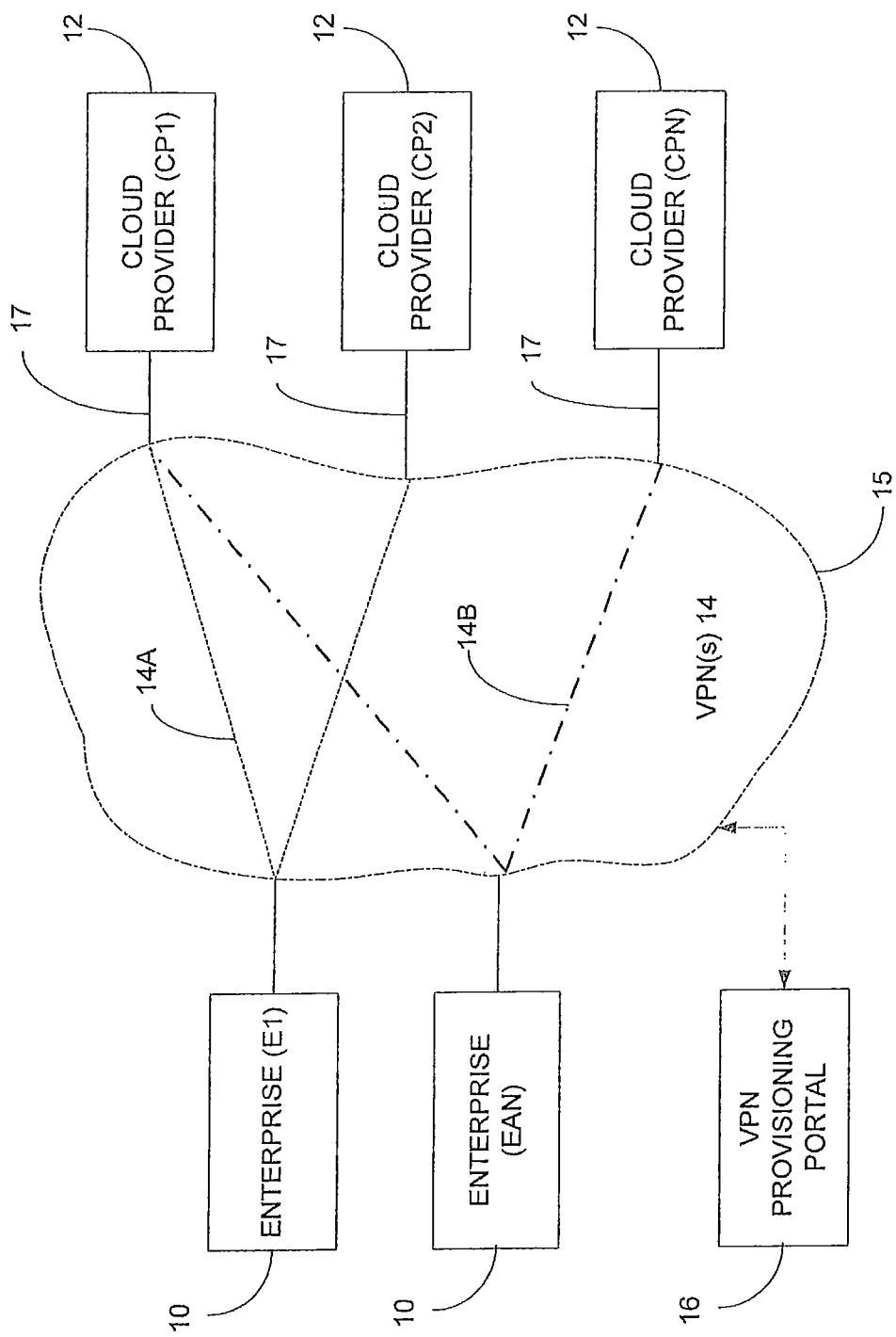
FIG. 1 is a system diagram illustrating one possible implementation of a computing network providing virtualized connectivity in a cloud services environment.

Aspects of the present disclosure involve virtualized connectivity in a cloud services environment. More particularly, private enterprise networks are extended to a content or a service source, such a cloud data center, by way of a virtualized private handoff that may eliminate the necessity of a private circuit or line connection while providing the customer with the level of privacy and security required. Stated differently, aspects of the present disclosure involve private network addressing between an enterprise or other cloud customer and a cloud provider over shared network resources so that more than one enterprise may obtain private secure access to cloud resources over a shared connection between the shared network resources and the cloud provider. Moreover, multiple enterprises may access multiple cloud providers and resources privately over shared network resources by way of private virtual connections over shared physical connections.

Embodiments disclosed herein provide a scalable networking environment for implementing a cloud computing architecture across a secure private network. For example, a service provider may provide private network access across its network between two or more customer locations (e.g., via a Virtual Private Network "VPN", such as Layer 2 or Layer 3 Multiprotocol Label Switching "MPLS" VPNs). According to an example embodiment, the service provider can further provide private access between the two or more customer locations in addition to providing private access (or a pseudo-private, private/public hybrid type access) to one or more cloud service providers. The cloud service providers can be situated internally in and/or externally to the service provider network. Additionally, example embodiments provide a multitenant approach whereby two or more customers of the service provider (e.g., each having their own VPN across the network) have private access (or a pseudo-private, private/public hybrid type access) to the one or more cloud service providers.

Furthermore, and assuming that two or more cloud service providers are configured to provide private and secure cloud services (e.g., SaaS, PaaS, IaaS, and the like) across a service provider network, embodiments herein provide segregation (or privacy) between the two or more cloud service providers and between the two or more customers. For example, assume a first cloud service provider CP1 and a second service provider CP2 that provide respective cloud services to a first enterprise E1 and a second enterprise E2 across a service provider network, whereby enterprise E1 and enterprise E2 have respective VPNs across the service provider network. In such a multitenant/provider-segregated environment, cloud service provider CP1 would be restricted from accessing (i.e., cannot 'see') data/traffic transceived across the service provider network between cloud service provider CP2 and enterprise and E1 and E2. Similarly, cloud service provider CP2 would be restricted from accessing data/traffic transceived across the service provider network between cloud service provider CP1 enterprise E1 and E2. Furthermore, enterprise E1 would not have access to data/traffic transceived between enterprise E2 and cloud service providers CP1 and CP2. Likewise, enterprise E1 would not have access to data/traffic transceived between enterprise E1 and cloud service providers CP1 and CP2.

Example embodiments further provide scalability by enabling public-to-private and private-to-public network address translation (NAT) between cloud service providers and customers across the service provider network. Embodiments can further leverage functionality of firewalls (FWs), Virtual Local Area Networks (VLANs) and 802.1Q interfaces, Ethernet-over-MPLS, Virtual Routing and Forwarding ("VRF", for example, importing and exporting VRF tables/route distinguishers "RDs" throughout the service provider network), as well as other known protocols to implement various private and secure connectivity configurations between a service provider network, cloud service providers, and customers of the service provider network. Further yet, embodiments herein can utilize Layer 2 VPN functionality to facilitate Virtual Machine (VM) movement and migration in the cloud environment.

FIG. 1 is a system or network level diagram illustrating aspects of the present disclosure. In this system, two or more enterprises 10 (also referred to as customers) may access services provided by two or more cloud services providers 12 or other service providers. The use of the term "enterprise" (or customer) refers to one or more computing devices, which are likely but not necessarily part of a network of computing devices used by an enterprise, that are configured to access and provide access to application, computing and data resources internal and/or external to an enterprise. The use of term "cloud service provider" refers to one or more computing devices that are configured to provide application, computing and data resources over a network to one or more enterprises ranging from individuals to multinational corporations with geographically dispersed offices.

In the system set out in FIG. 1 and discussed relative to other embodiments disclosed herein, the enterprises 10 and the cloud providers are interconnected through virtual private networks (VPNs) 14 established on a common network infrastructure 15, which may be partially or completely segregated from public network components and infrastructure such as in the public Internet. In this example, enterprise (E1) may access services from cloud provider (CP1) and cloud provider (CP2) over a first VPN 14A for the first enterprise, whereas enterprise (EN) may access services from cloud provider (CP1) and cloud provider (CPN) over a second VPN 14B for enterprise EN. With respect to enterprise (E1), communication paths with cloud provider (CP1) and cloud provider (CP2) are enabled whereas a path between cloud provider (1) and cloud provider (2) is not enabled (or allowed). Similarly, with respect to enterprise (N), communication paths with cloud provider (CP1) and cloud provider (CP2) are enabled whereas a path between cloud provider (CP1) and cloud provider (CPN) is not enabled (or allowed). Further, communication paths between enterprises are also not enabled (or allowed). Thus, the system allows and enables private specific communications between enterprises and cloud providers and prohibits communications among enterprises or among cloud providers as well access in other forms to those networks.

The virtual connections between enterprises and cloud providers may be established and removed by way of a portal 16 coupled with the provider network implementing the VPNs. In various possible implementations, one physical connection 17 between the network implementing the VPNs and the cloud provider is shared and the system allows for the provisioning of a plurality of virtual connections between enterprises and the cloud provider over the physical connection. Stated differently, through the use of VPNs in the provider network and virtualizing a physical connection between the provider network and the cloud provider, a plurality of enterprises may privately access cloud services through the provider network over a shared physical connection with the cloud provider. While FIG. 1 illustrates single instances of cloud providers CP1, CP2 and CPN, any particularly cloud provider may have one or more data centers or computing locations and/or devices geographically proximate or remote that provide some form of service, and therefore several different shared connections may be provided between the provider network and the various cloud provider service locations. Similarly, an enterprise may range from a discrete computing device or a network of computing devices geographically dispersed, with different configuration for accessing the network 15 to obtain services from the various cloud providers 12.

Unlike conventional systems where each enterprise desiring a private connection with a cloud provider must have a dedicated physical connection with the cloud provider, aspects of the present disclosure allow a plurality of enterprises to share a physical connection (or line) through the establishment of private virtual (logical) communication channels with the cloud provider over the shared connection. The portal can control dynamically turning-up and tearing-down virtual connections to the cloud providers. In various examples, the portal can manage the importing and exporting of route targets through the provider network and at the enterprise and cloud provider routers, manage the provision of VLANs between the cloud providers and the provider network, and manage the provisioning of NAT services within the provider network and between the cloud provider and the enterprise. Besides the privacy, security, and flexibility in connecting with various cloud providers without having to establish a physical connection, as the network is shared by the various enterprises and cloud providers is not part of a public network, the system also allows communications between an enterprise and a cloud provider to avoid much of the latency associated with conventional cloud computing that work over a public network such as the Internet, in one example, because the private network can manage traffic flows between the nearest, logically and/or geographically, enterprise device requesting the service and cloud provider location offering the requested service.

The portal 16, which also may be referred to as a customer management module, performs functionality including, but not limited to, collecting, aggregating, filtering, managing, configuring, reporting, and presenting layer 4+(e.g., transport layer, application layer, etc.) data/statistics from the network to customers and/or cloud service providers. For example, the portal can collect determine Quality of Service (Qos) data (e.g., metrics, statistics, etc.) associated with a particular customer and then report and/or present the QoS data to the particular customer. Assuming that the network offers a variety of QoS levels to customers, the customer management module can enable a particular customer to select one or more QoS levels (or class of service) from the variety of offered QoS levels. The customer management module can also enable a particular enterprise or other customer to select from among the cloud service providers for establishing a 'connection' to one or more cloud service providers. The customer management module can also enable a particular customer to select one or more services (e.g., SaaS, IaaS, PaaS, etc.) associated with each cloud service provider such that the particular customer will be able to utilize the each selected service from across the network (i.e., cloud). The customer management module can also provide a customer portal (e.g., web portal) that enables a particular customer to view and manage the various QoS levels, cloud service providers, services, etc., associated with the particular customer. The customer management module can also provide various selectable cloud packages that include, for example, one or more of QoS levels, cloud service providers, services, pricing models, downgrades/upgrades, etc., or any combination or association thereof, from which a customer can select (e.g., via the portal).

Figure 2:
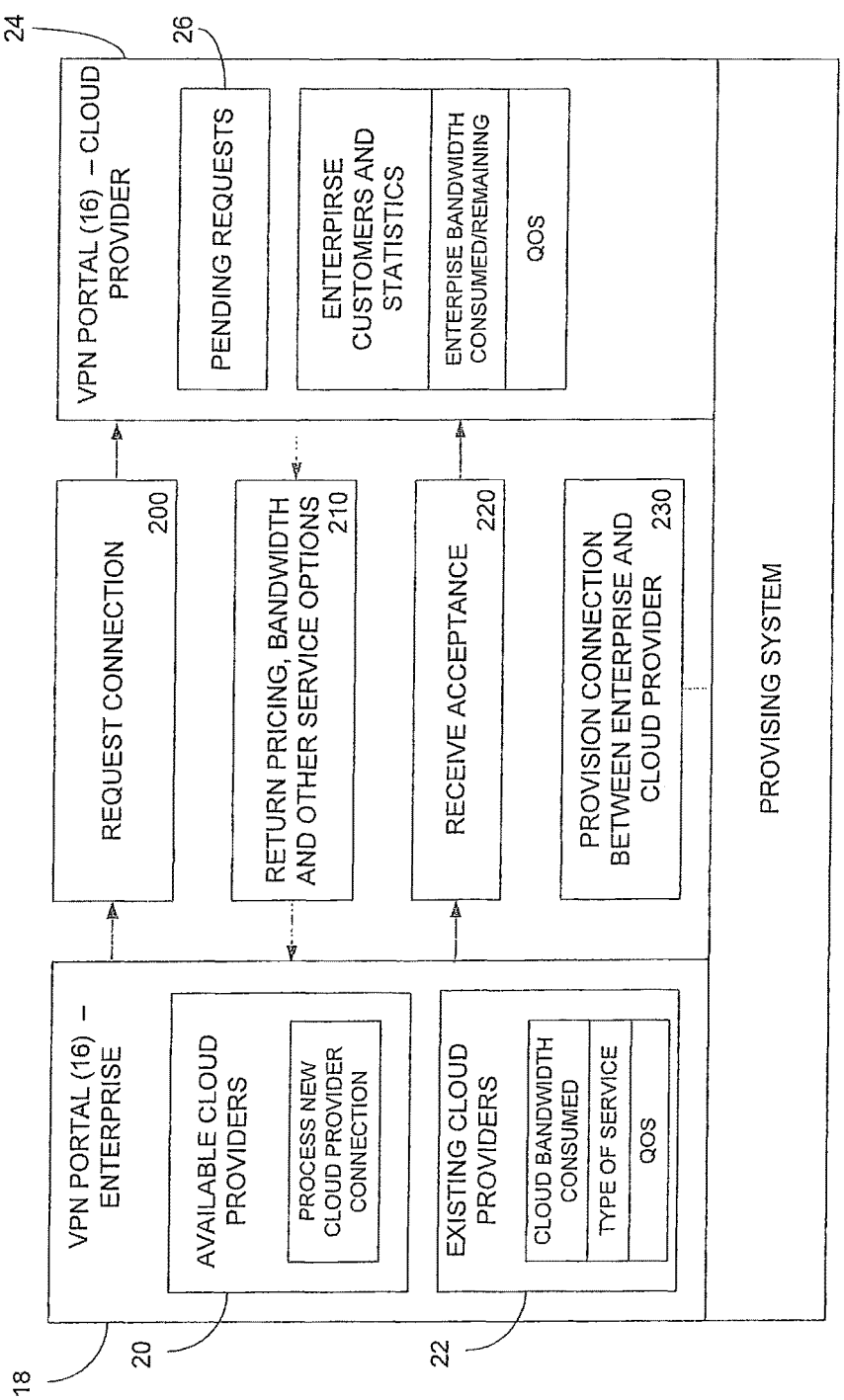
FIG. 2 is a block diagram illustrating a provisioning portal and associated method of establishing a virtual connection between a cloud provider and an enterprise over a private network, the virtual connection including a physical connection shared between the enterprise and other enterprises.

The VPN provisioning portal 16, shown in more detail in FIG. 2, also acts as a virtual marketplace for enterprises or other consumers of cloud services to select and obtain access to a cloud provider. When an enterprise or other customer logs in to the portal, a customer application 18 is launched that presents the enterprise user with a list of available cloud providers 20 as well as a list of existing cloud providers 22 (i.e., those cloud providers that the enterprise is accessing by way of the systems described herein). Some cloud providers may avail their services to all enterprises, while other cloud providers may have membership limitations (e.g., a cloud provider may only provide services to health care enterprises). The portal 16 also provides a mechanism for cloud providers to register and make themselves available for enterprises using the system, and to monitor and process transactions with enterprises. For example, as shown in FIG. 2, the portal may also include a cloud provider application 24 that allows the cloud provider to manage its interaction with the system and customers.

To obtain services from a new cloud provider using the system, in operation, the enterprise requests a connection to a cloud provider (operation 200). The request may be transmitted to a cloud provider application, which may reside on the portal 16 or otherwise. For example, the portal may include functionality accessible by the cloud provider allowing the cloud provider to review its accounts, process new customers, analyze performance statistics and the like. The cloud provider application may include an identification of pending requests 26 as well as information concerning the requests. The cloud provider processes the request and returns a price for the requested service (operation 210). The portal applications 18, 24 are configured to allow the enterprise and cloud provider to negotiate pricing, bandwidth, term, and other aspects of the relationship between the enterprise and the cloud provider. When the terms are accepted (operation 220), the system provisions the new connection between the enterprise and the cloud provider (operation 230).

Figure 3:
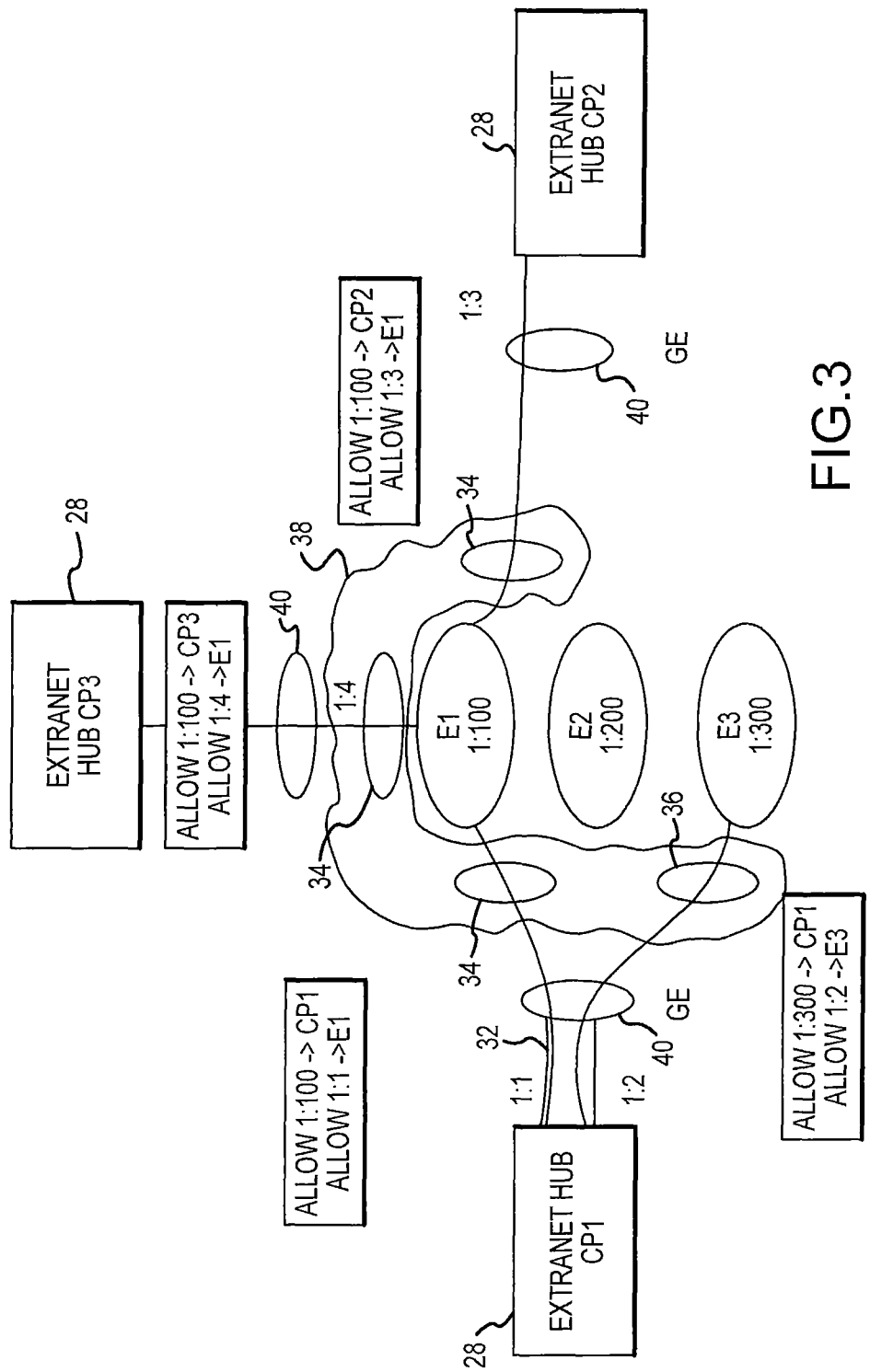
FIG. 3 is a logic diagram illustrating one way to implement the system illustrated in FIG. 1.

FIG. 3 is a system diagram illustrating one possible implementation conforming to aspects of the present application. In this example, similar to FIG. 1, three cloud providers CP1-CP3 are illustrated along with three customers or enterprises E1-E3. At the various cloud provider locations, an extranet hub 28 is shown. An extranet hub may include on Ethernet hub, a switch, a router or other piece of equipment where the cloud provider is connected with the private network. In this example system and for purposes of illustrating aspects of the system, enterprise E1 includes connections with cloud providers CP1, CP2, and CP3 over a first VPN 34, enterprise E2 has no connections with a cloud provider, and enterprise E3 has only one connection with cloud provider CP1 over a second VPN 36. Each of the VPNs may be implemented on a service provider network

38. As shown, enterprise E1 and enterprise E3 share a common physical connection 32 to cloud provider CP1.

Each cloud provider has a unique identifier associated with it. In the present example, the unique identifiers 1:1, 1:2, 1:3 and 1:4 are associated with cloud providers CP1, CP1, CP2 and CP3, respectively. Similarly, each customer, e.g., enterprises E1-E3, also has their own identifiers. In the present example, the unique identifiers 1:100, 1:200, and 1:300 are associated with enterprises E1, E2, and E3, respectively. Of note, CP1 includes the first identifier 1:1 associated with private communications with enterprise E1 and the second identifier 1:2 associated with private communications with enterprise E3. Each enterprise (or customer) shown in FIG. 3 is a logical representation of the enterprises computing network, which may be a local area network, a wide area network, or other forms of networks and combinations thereof, through which various users of various possible computing devices, such as personal computers, terminals, thin clients, tablets, smart phones, etc., may access various possible provisioned cloud service. Moreover, the computing network may include geographically dispersed computing elements. Private communications between a given cloud provider and an enterprise may be on restricted to a particular router or device with the customer network or may be available to a plurality of routers or devices with the customer network that may be geographically dispersed.

In the particular example shown, there are one or more gigabit Ethernet (GigE) connections 40 between the network 38 implementing the VPNs and extranet hubs 28 at respective data centers for the cloud providers 12. The extranet hubs 28 may include a physical port for the GigE connection. To provide privacy over a shared physical connection 40, each shared connection may be provisioned with a customer specific VLAN between the customer and a cloud provider. So, separate and dedicated VLANs are established to provide a virtual or logical connection between the customers and the cloud provider over the respective VPNs. Further, each VLAN has its own particular identification. Still referring to FIG. 3, to provision the private interconnections, the system includes allow statements or other route target mechanisms that can be utilized by virtual routing and forwarding (VRF) tables to provision the network. The allow statements in this example are logical descriptions of how the VPNs are provisioned to provide the described connections between customers and providers. For example, Allow 1:100>CP3, Allow 1:4>E1 indicates that there is a VLAN provisioned between enterprise E1 (with ID 1:100) and cloud provider CP3 (with ID 1:4). Stated differently in colloquial terms, enterprise E1 can "see" cloud provider CP3, and vice versa, cloud provider CP3 can "see" enterprise E1. In contrast, for example, none of the cloud providers can see enterprise E2, and enterprise E2 cannot see any of the cloud providers.

The system illustrated in FIG. 3 involves a layer 3 interconnection between the hub and the private network. Each cloud provider has a transactional VRF for each enterprise that provides VLAN separation on a customer basis at the hub site. Thus, cloud providers cannot see each other, and customers may privately access the cloud provider location. Through such VLAN separation, a single port or connection may be ordered for a hub and multiple customers may privately use the port.

With respect to QoS, as introduced above, an enterprise is able to establish the QoS for the various cloud providers the enterprise accesses by way of the various systems described herein. Through the portal, a customer is able to define the QoS for each provisioned cloud service provider, and the system maintains and manages the defined QoS. The QoS is inherited on the VPN and the VLAN with the customer. For the sake of illustration, say, for example that cloud provider CP1 is providing a Voice over IP (VoIP) service at a first QoS priority to the enterprise E1 and cloud provider CP2 is providing some other service to enterprise E2 at a second QoS priority, lower than the first. Since in one possible implementation, only one physical link is provided between the VPN and the cloud provider, with such QoS provisioning, VoIP traffic over that link may be prioritized over the other traffic, which results in the enterprise customer's VoIP traffic being prioritized ahead of other traffic. In a conventional public network model, prioritization of traffic is difficult if not impossible, and hence a customer cannot prioritize and ensure that its network phone traffic is prioritized. Similarly, in a conventional private cloud environment where separate physical connections between an enterprise and each cloud provider are required, it is possible to achieve a high QoS level for a cloud service but at the cost of establishing and maintaining a dedicated physical connection to the cloud provider.

Figure 4:
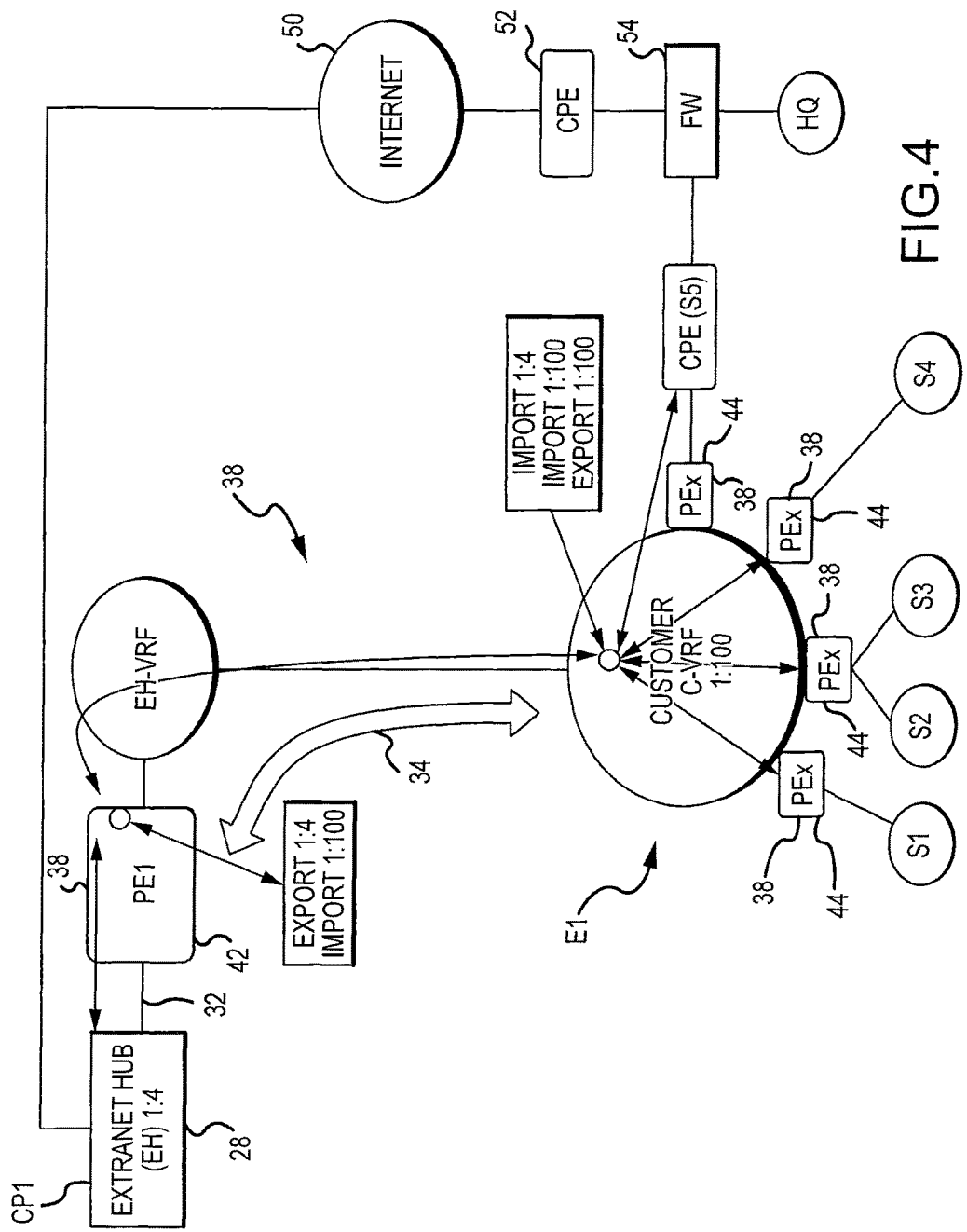
FIG. 4 is a system diagram illustrating one way to implement the logic of FIG. 3, the system of FIG. 4 allowing a plurality of enterprise network offices direct access to a cloud service.

FIG. 4 is a system diagram illustrating another possible implementation according to aspects of the present disclosure, and particularly illustrating the importation and exportation of route targets into VRF tables at various routers to provision the private network for the shared and private virtualizations discussed herein. This example further illustrates provisioning the system so that multiple offices of a customer may each access a cloud service. Stated differently, a customer network with several different geographical locations within the network has access to cloud services through the described system. In another example and in contrast, described in more detail herein, a customer may limit access to the system through a discrete office, device or other point of access between the larger customer network and the cloud providers such that remote offices access the cloud providers through the provisioned device when authorized.

Still referring to FIG. 4, this example illustrates the provisioning of offices S1-S5 of enterprise E1 (identification 1:100) to access cloud services provided by CP1 (identification 1:4). The example set out herein may be extended to any number of enterprises and cloud providers. A VLAN 34 is provisioned in the network 38 between the enterprise E1 and the cloud provider CP1. While other enterprises are not shown in FIG. 4, such enterprises can access the cloud provider CP1 over the shared connection. The shared connection 32 connects the cloud provider with the service provider network 38. In this case, the service provider network includes a router 42, such as a provider edge router (PE1), interconnected with the hub 28 through the shared GigE connection 32. The service provider network also includes additional routers 44, which may also be provider edge routers, at the intersections between the service provider network 38 and the enterprise offices S1-S5.

Referring more particularly to the enterprise E1, a plurality of routers 44 may be positioned at various offices S1-S4. In this example, five offices are shown having direct access to the cloud provider CP1 by way of the described system; any number of offices, however, is possible. Each of the routers 44 is configured with a virtual routing and forwarding (VRF) table or other form of routing table.

Generally, the relevant customer routes and the relevant cloud provider route are exchanged with the routers in the private network that can establish the VPN and VLAN between cloud provider and the enterprise. More particularly, the relevant cloud routes are exported to the VRF of router 42 that is connected with the extranet hub 28. Similarly, the relevant enterprise routes are exported to the VRFs of routers 44 connected with the customer offices. The cloud provider routes are also imported into the customer's virtual routing and forwarding table including into the VRFs of the routers 44 servicing the various offices (e.g., S1-S5) of the customer. Conversely, the customer routes, including those routes of the office routers, are imported into the virtual routing and forwarding tables of the router 42 servicing the extranet hub 28 or other routing devices of the cloud. Thus, the various customer offices S1-S5, as well as possibly others, may access the cloud provider through the established VPN and the shared line 32.

Still referring to FIG. 4, the route targets for the cloud serviced by extranet hub 1:4 are exported into the routing table for PE router 42. For example, a particular cloud provider may operate numerous servers to provide its cloud services. A range of IP addresses may be defined for reach server, and these IP addresses are the route targets exported to PE router 42. Further, the route targets for enterprise E1 are exported into PE routers 44. More specifically, the route targets for enterprise E1 (1:100) are imported into PE router 38 from router 44, and the route targets for extranet hub 1:4 are imported into PE router 44. Accordingly, enterprise E1, including each of the offices S1-S5, can communicate with the cloud provider CP1 serviced by extranet hub 28. Because the customer VRF table is common to all offices S1-S4, each office may access could provider CP1. Additionally, customer routes 1:100 for each office are also imported into the customer VRF allowing the enterprise network to be a full mesh such that S1 may communicate with S2, S1 may also communicate with S3 and so on.

Moreover, information packets being exchanged between the cloud provider and enterprise are tagged with the respective identifications. With the described tagging and VRF provisioning, information exchanged between the enterprise and the cloud provider is segregated across the private but shared network as well as over the shared connection with the cloud provider.

The system illustrated in FIG. 4 also illustrates a redundant path between the cloud provider CP1 and the enterprise E1. Here, the cloud provider includes a conventional connection with the public Internet 50. The enterprise may include a public Internet facing router 52 configured to transmit and receive (transceive) communications between the cloud provider and the public Internet through a firewall 54. The enterprise system, including the various offices S1-S5, communicates with the cloud provider through the redundant path. In this example, only office S5 is shown having a connection with the redundant path and such an implementation the other offices can redundantly communicate through office S5. Alternatively, the enterprise may implement any number of firewalls and provide distinct redundant connections for the various offices.

Figure 5:
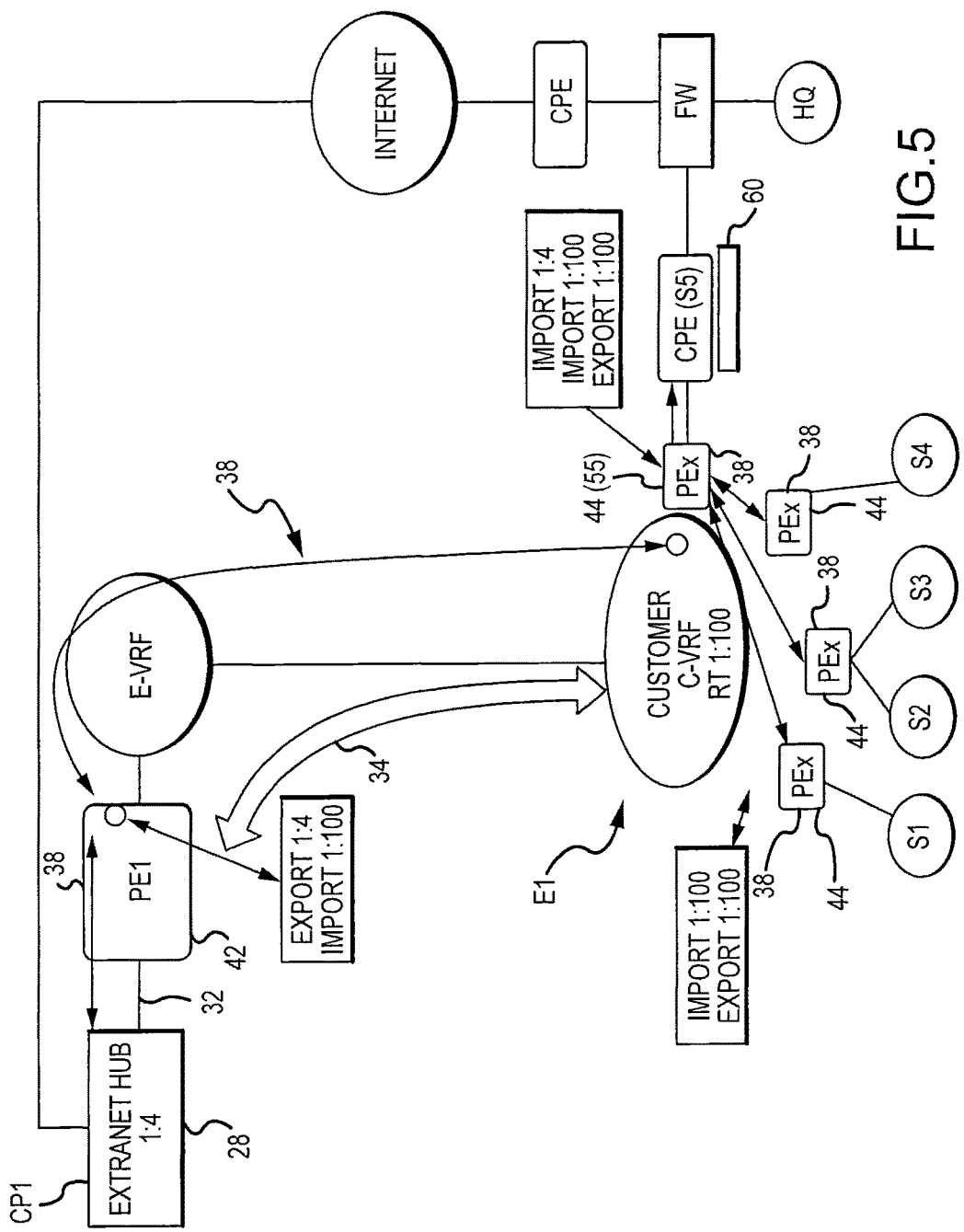
FIG. 5 is a system diagram illustrating one way to implement the logic of FIG. 3, the system of FIG. 5 allowing a plurality of enterprise network offices indirect access to a cloud service when a central office of the customer network provisions such access.

FIG. 5 is a system diagram illustrating another possible implementation according to aspects of the present disclosure. This example illustrates provisioning the system so that one customer location (e.g. S5) may access the cloud service directly through a VPN 34 and a shared connection 32, and that customer location distributes routing to various offices (e.g. S1-S4) within a customer network. In this example, the customer network includes offices S1-S5 with each of the offices including various types of customer premise equipment (CPE) including routers. More particularly, a router 60 at location S5 is the portal through which various offices S1-S4 may access the cloud service provider CP1. In this example, a customer may control access to the cloud provider by offices S1-S4 and those offices cannot directly reach the cloud provider through the VPN and shared physical connection.

In this example, the cloud provider are exported into the PE router 42 proximate the hub, and imported into the virtual routing and forwarding table of the router 44(S5) connecting the customer site S5 with the private network 38. Conversely, the customer route for office S5 is exported to the router 44(S5) and imported into the extranet hub router 42. Here, unlike the example of FIG. 4, the customer route targets for only location S5 are exchanged with the cloud provider routes. Conventional enterprise networks may have a central office having a single point of access to outside resources, while other offices, which may be geographically remote, are connected to the central office and access any outside resources through the central office. The remaining offices may be interconnected in a full mesh or otherwise. For a full mesh, the customer 1:100 routes are exchanged between the PE routers 44 associated with the various offices such that each office may communicate with any other office.

Figure 6:
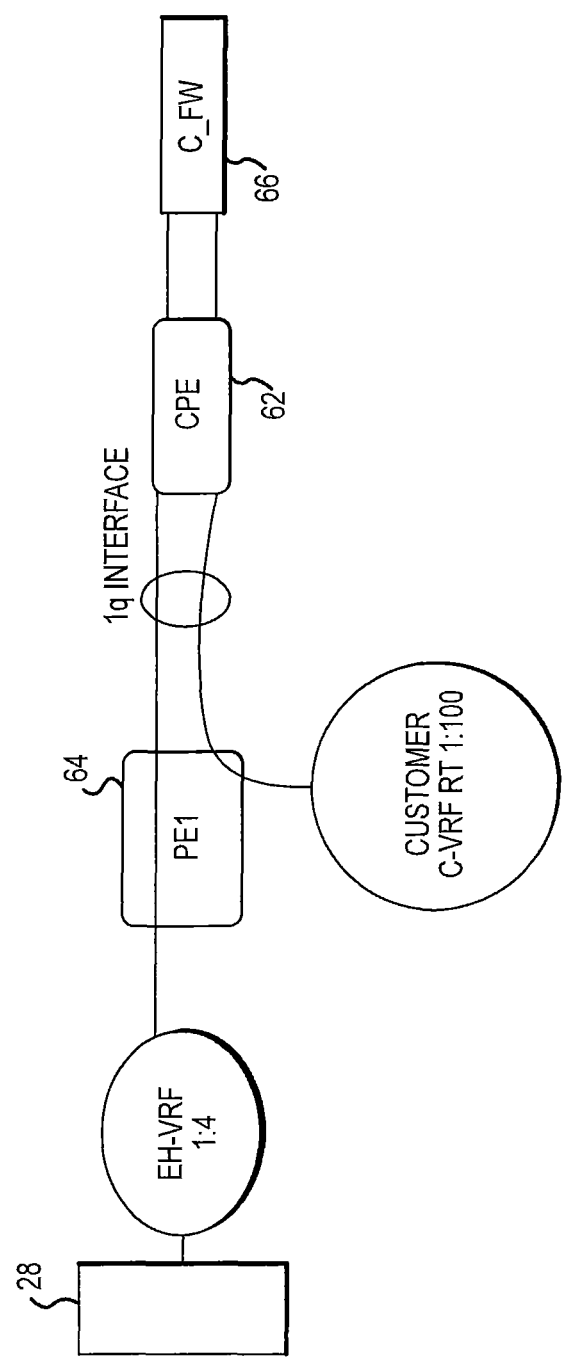
FIG. 6 is a system diagram illustrating one way to implement the logic of FIG. 3 using a layer 2 connection between an enterprise and a cloud provider over a provider network.

FIG. 6 is a system diagram illustrating another possible implementation according to aspects of the present disclosure. This implementation may be considered as having a layer 2 connection with the cloud provider in contrast to the implementation illustrated in FIGS. 4 and 5 that may be considered as having a layer 3 connection with the cloud provider. This implementation may be used when the customer employs an Ethernet network or otherwise assumes Ethernet delivery. Thus, where the above examples provided logical separation of customers accessing and using the VPN through layer 3 route targets (policies) implemented in route tables in the various routers of the private network, the example of FIG. 6 provides traffic separation and privacy through a layer 2 pseudo wire between the customer routers and the cloud provider. In terms of performance, this example is similar to FIG. 5 in that various offices communicate with the cloud provider though a discrete access point to the customer network.

More particularly, a one-to-one port relationship is established between customer premise equipment (e.g. a router) 62 at the enterprise and a hub 28 at the cloud provider location using a pseudo-wire implementation. In one example, an 801.1q VLAN is established between a PE router 64 and the enterprise 62. The customer premise equipment may include a firewall 66. Here, cloud provider routes are exported to the router 62 and further imported into only one, in one example, customer VRF. Other offices, besides that office serviced by CPE 62, access the cloud provider and intercommunicate similarly to as discussed relative to FIG. 5.

Figure 7:
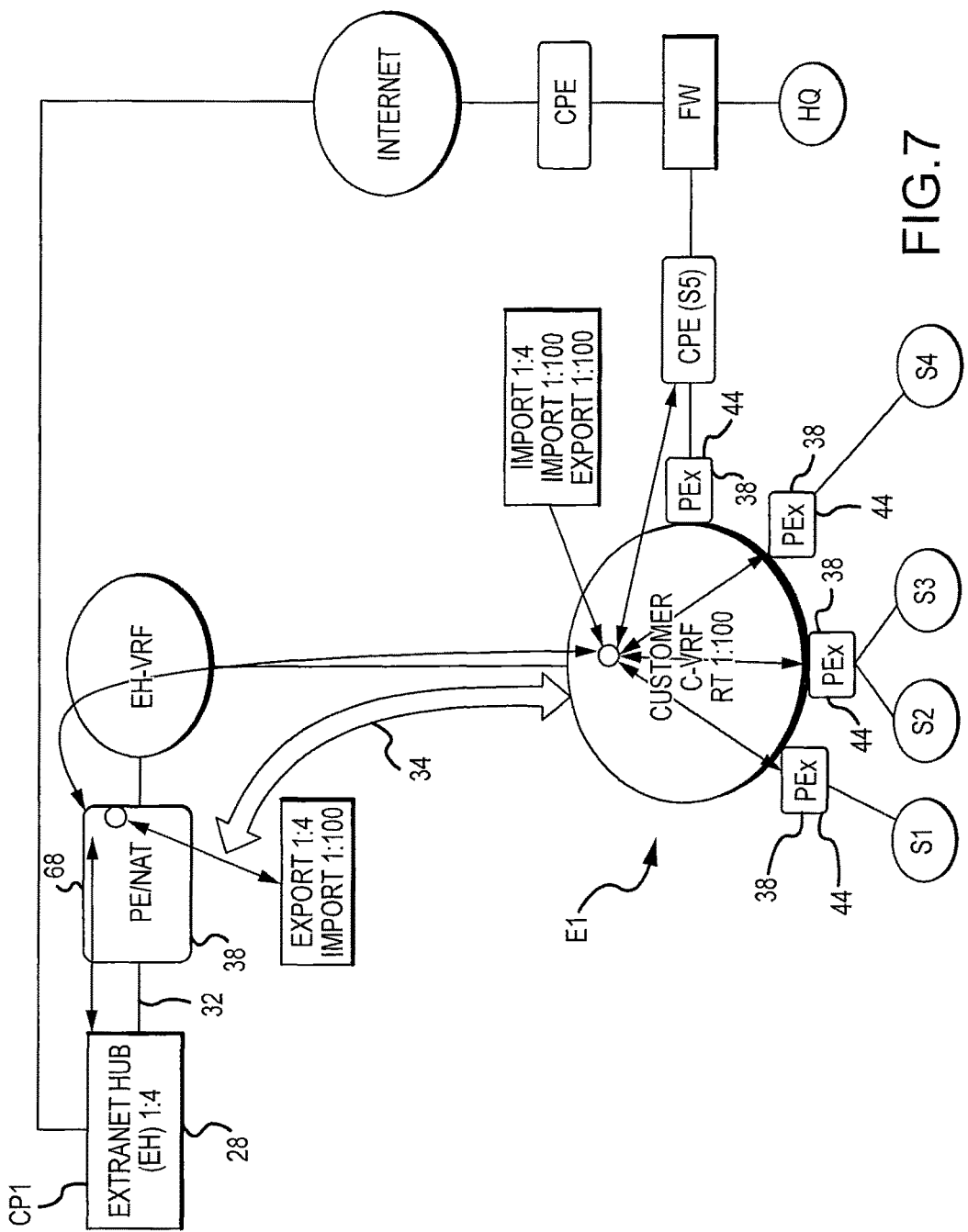
FIG. 7 is a system diagram similar to FIG. 3 and further including Network Address Translation (NAT) services.

FIG. 7 describes a system illustrating another possible implementation including network address translation (NAT) services. Typically, an enterprise will use private internet protocol (IP) space such that internal IP addresses of equipment within the enterprise network may overlap with IP addresses in the public Internet as well as other networks. Stated differently, equipment within an enterprise network may have the same IP address as equipment outside the network, such as other customers using the system to access the same cloud provider, and without some form of translation data being routed to and from that overlapping address there is not a way to properly send the data. Moreover, connecting to a cloud provider, which is normally accessible through the public Internet, presents security and privacy concerns. Similarly, because cloud providers are often configured to communicate over the public Internet, interacting with the private IP space of an enterprise presents challenges to the cloud provider.

In the present example, the system manages IP address overlaps and translation between public IP space associated with the cloud provider and private IP space of the enterprises through implementation of one or more NAT services within the system interconnecting the cloud provider(s) and the enterprise(s). This implementation is similar to that shown in FIG. 4 with the addition of a NAT service at the provider edge router in communication with the cloud provider hub. In this example, an edge router with NAT services is in communication with the cloud provider's extranet hub.

More particularly, a VLAN 34 is provisioned in the network 38 between the enterprise E1 and the cloud provider CP1. While other enterprises are not shown in FIG. 7, such enterprises can access the cloud provider CP1 over a shared connection 32. The shared connection 32 connects the cloud provider with the service provider network 38. In this case, the service provider network includes a router 68, such as a provider edge router (PE1), interconnected with the hub 28 through the shared connection 32, which may be a GigE connection. Unlike router 42 of FIG. 4, the router 68 also include NAT services. Generally speaking, the cloud provider side of the router 68 involves public IP space whereas the customer side of the router 68 involves the private IP space of the customer. The Router/NAT 68 advertises a public IP space to the cloud provider, which may be geographically unique, and then translates the packets received to the appropriate addresses of the private customer space. The service provider network also includes additional routers 44, which may also be provider edge routers, at the intersections between the service provider network 38 and the enterprise offices S1-S5. These routers do not include NAT services, in one example. However, NAT services may be provided in other locations of the private network, and NAT services may be provided in some or all of the routers servicing other hubs of CP1 as well as hubs of other cloud providers.

Referring more particularly to the enterprise E1, a plurality of routers 44 may be positioned at various offices S1-S5. In this example, five offices are shown having direct access to the cloud provider CP1 by way of the described system; any number of offices, however, is possible. Each of the routers 44 is configured with a virtual routing and forwarding (VRF) table or other form of routing table.

Generally, the relevant customer routes and the relevant cloud provider routes are exchanged with the routers in the private network that can establish the VPN and VLAN between cloud provider and the enterprise. More particularly, the relevant cloud routes are exported to the VRF of router 42 that is connected with the extranet hub 28. Similarly, the relevant enterprise routes are exported to the VRFs of routers 44 connected with the customer offices. The cloud provider routes are also imported into the customer's virtual routing and forwarding table including into the VRFs of the routers 44 servicing the various offices (e.g., S1-S5) of the customer. Conversely, the customer routes, including those routes of the office routers, are imported into the virtual routing and forwarding tables of the router 42 servicing the extranet hub 28 or other routing devices of the cloud. Thus, the various customer offices S1-S5, as well as possibly others, may access the cloud provider through the established VPN and the shared line 32.

Still referring to FIG. 7, the route targets for the cloud serviced by extranet hub 1:4 are exported into the routing table for PE router 42. For example, a particular cloud provider may operate numerous servers to provide its cloud services. A range of IP addresses may be defined for each server, and these IP addresses are the route targets exported to PE router 42. Further, the route targets for enterprise E1 are exported into PE routers 44. More specifically, the route targets for enterprise E1 (1:100) are imported into PE router 38 from router 44, and the route targets for extranet hub 1:4 are imported into PE router 44. The NAT provides translation between the customer route targets and the cloud provider route targets. Accordingly, enterprise E1, including each of the offices S1-S5, can communicate with the cloud provider CP1 serviced by extranet hub 28. Because the customer VRF table is common to all offices S1-S5, each office may access could provider CP1. Additionally, customer routes 1:100 for each office are also imported into the customer VRF allowing the enterprise network to be a full mesh such that S1 may communicate with S2, S1 may also communicate with S3 and so on.

Moreover, information packets being exchanged between the cloud provider and enterprise are tagged with the respective identifications. With the described tagging, VRF provisioning, and NAT service(s) information exchanged between the enterprise and the cloud provider is segregated across the private but shared network as well as over the shared connection with the cloud provider.

In other possible examples, edge routers with NAT services may be positioned in proximity to and in communication with extranet hubs at various different cloud provider locations. Further, the cloud provider may provide additional and/or redundant services at discrete locations. In such an implementation, the discrete locations may include there own identifications. So, for example if CP1 has three data centers providing some or all of its various services, the hubs for those data centers may have identifications 1:4, 1:5 and 1:6. However, the hubs export the same IP address or some portion of the IP address, e.g., 1.1.1.1., to the routers for some associated service. However, each router includes information concerning the hub to which it is attached which includes geographic information or some indication of its logical location in the network. Thus, when a customer attempts to access the cloud service, the private network is able to route the request to the nearest router 68 that provides access to the cloud servicing the request. As each PE router includes the associated specific cloud routes, the router that services the request can privately communicate with the associated cloud resources that will service the request.

Figure 8:
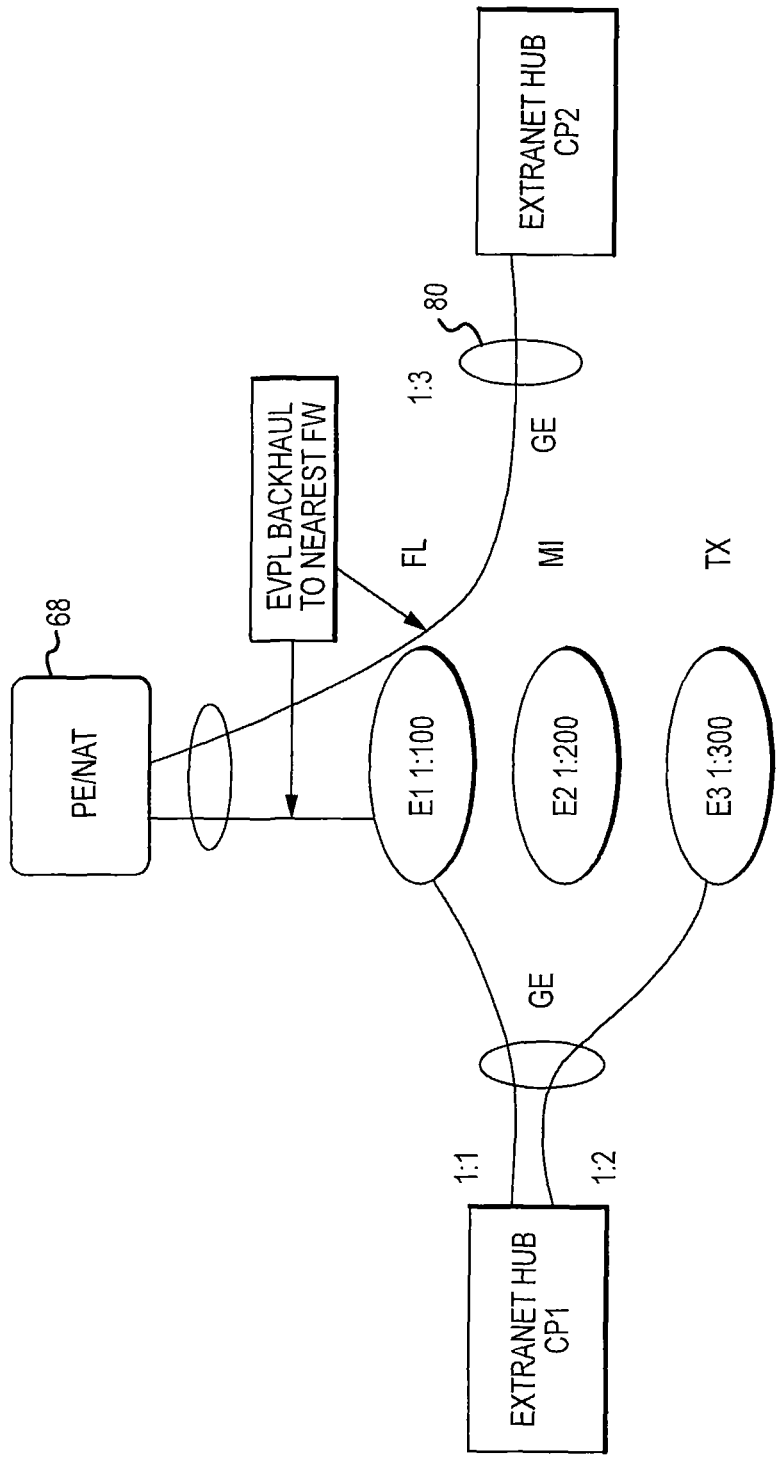
FIG. 8 is a logic diagram illustrating one way to implement the system illustrated in FIG. 7.

FIG. 8 illustrates one particular way to implement the system described in FIG. 7. Here, a GigE/EVPL backhaul connection 80 is provisioned between a cloud provider (e.g., CP2) and a provider edge router 68 including NAT services within the network 28 providing VPN services. The network, which may include additional PE routers as well as other routing equipment including a backbone network, is connected with an enterprise (e.g., E1) over a physical connection that can be shared with other enterprises. Thus, the PE router and NAT are logically positioned between the enterprise and the cloud provider. This implementation is helpful for cloud providers that conventionally only support public interfaces and network addresses.

Figure 9:
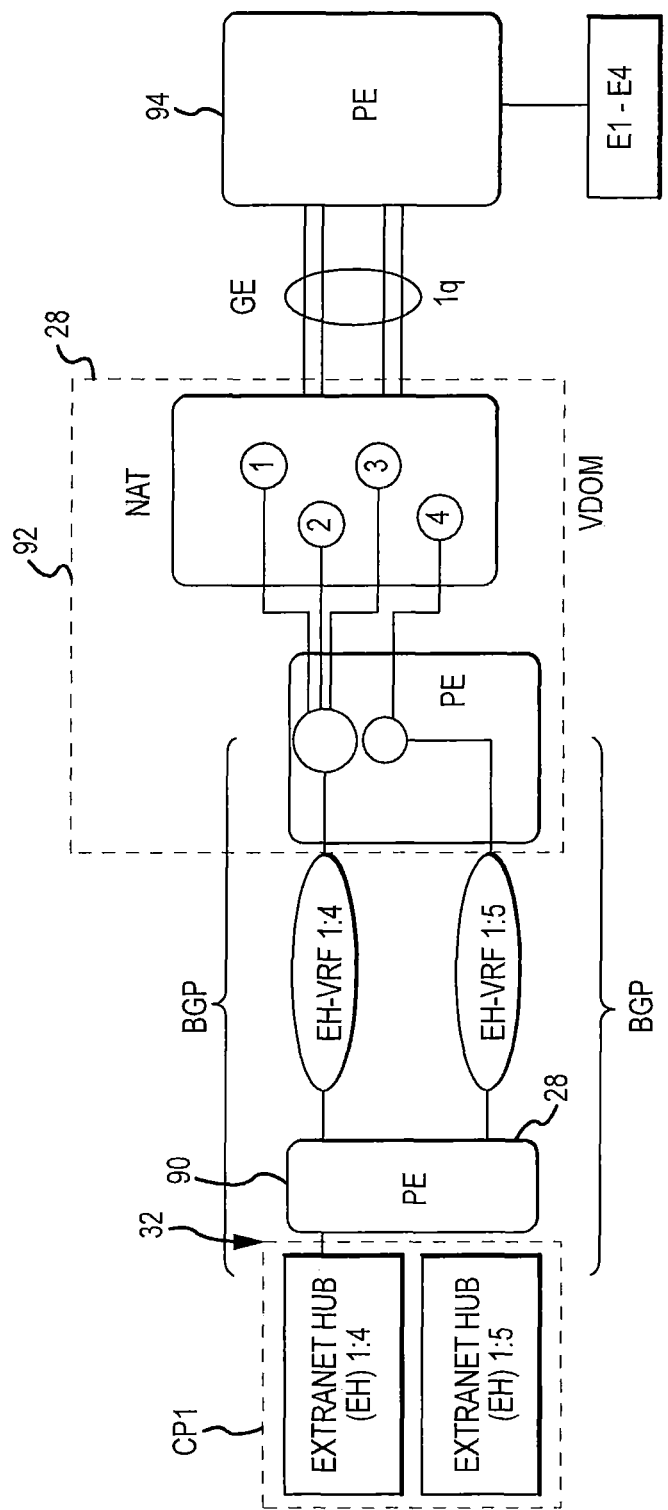
FIG. 9 is a system diagram illustrating one particular way to implement a system as set out if FIG. 1 and further including NAT services with virtual domains.

FIG. 9 is a diagram illustrating another system illustrating a way to provide private virtualized cloud services to a plurality of customers as well as providing NAT services. In this example implementation, a cloud provider CP1 is shown having two discrete data centers with associated hubs having identifications 1:4 and 1:5, respectively. These data centers or cloud provider locations may be geographically separated in different locations, say Seattle and London. The system, besides allowing a plurality of customers E1-EN to access each cloud provider location over a shared connection(s) 32 to the particular location, also can route customer communications to the nearest (geographically and/or logically) cloud provider data center providing the requested service. Thus, a customer in Europe requesting a cloud service might be routed to the cloud provider location in London whereas a customer in California might be routed to the cloud provider location in Seattle. Should either location go off-line for any reason, communications are automatically routed to the other on-line location.

In this implementation, one or more first PE routers 90 are shown in proximity to the cloud provider hubs, and a second PE router 92 implementing a NAT service with virtual domains somewhere in the private network 28 between the cloud provider and the plurality of customers configured to communicate with the cloud provider. Alternatively, the PE router at the hub or other routers may also include the NAT service. A peering connection using border gateway protocol session (BGP) is established between the first PE router(s) at the cloud provider hub(s) and the second PE router implementing the NAT service in the network. The BGP session, in one implementation, is created only once and hence minimizes the cloud provider's overhead. Moreover, customers may share the BGP session and may be provisioned in the system to access the cloud provider or decommissioned so access is not allowed without the cloud provider being involved in the changes (i.e., customer additions and deletions are transparent to the cloud provider).

In this example, four customers E1-E4 are illustrated as using the system to obtain cloud services. The NAT includes four corresponding virtual domains. A virtual domain implements policies, quality of services and other customer (enterprise) unique routing parameters. In one example, each VDOM defines a virtualized firewall instance for each customer (enterprise) where each virtualized firewall implements policies specific to each customer. In this example, the NAT implementing the VDOM may be implemented in a single router where multiple customers may be provisioned to access the BGP session and the associated cloud provider hub. In this example, a third set of PE routers 94 are associated with each of the four customers C1-C4.

As with other implementations discussed herein, various route targets of the customer and the cloud provider are imported and exported into VRF's of the PE routers. The route targets for the hub(s) are exported to the first PE router(s), while the customer routes are exported to the third PE router(s). Additionally, the cloud provider routes are imported into the second PE router implementing the NAT and similarly the enterprise routes are imported in the second PE router. In contrast to other implementations, the cloud and enterprise route targets are imported into the VDOMs.

Figure 10:
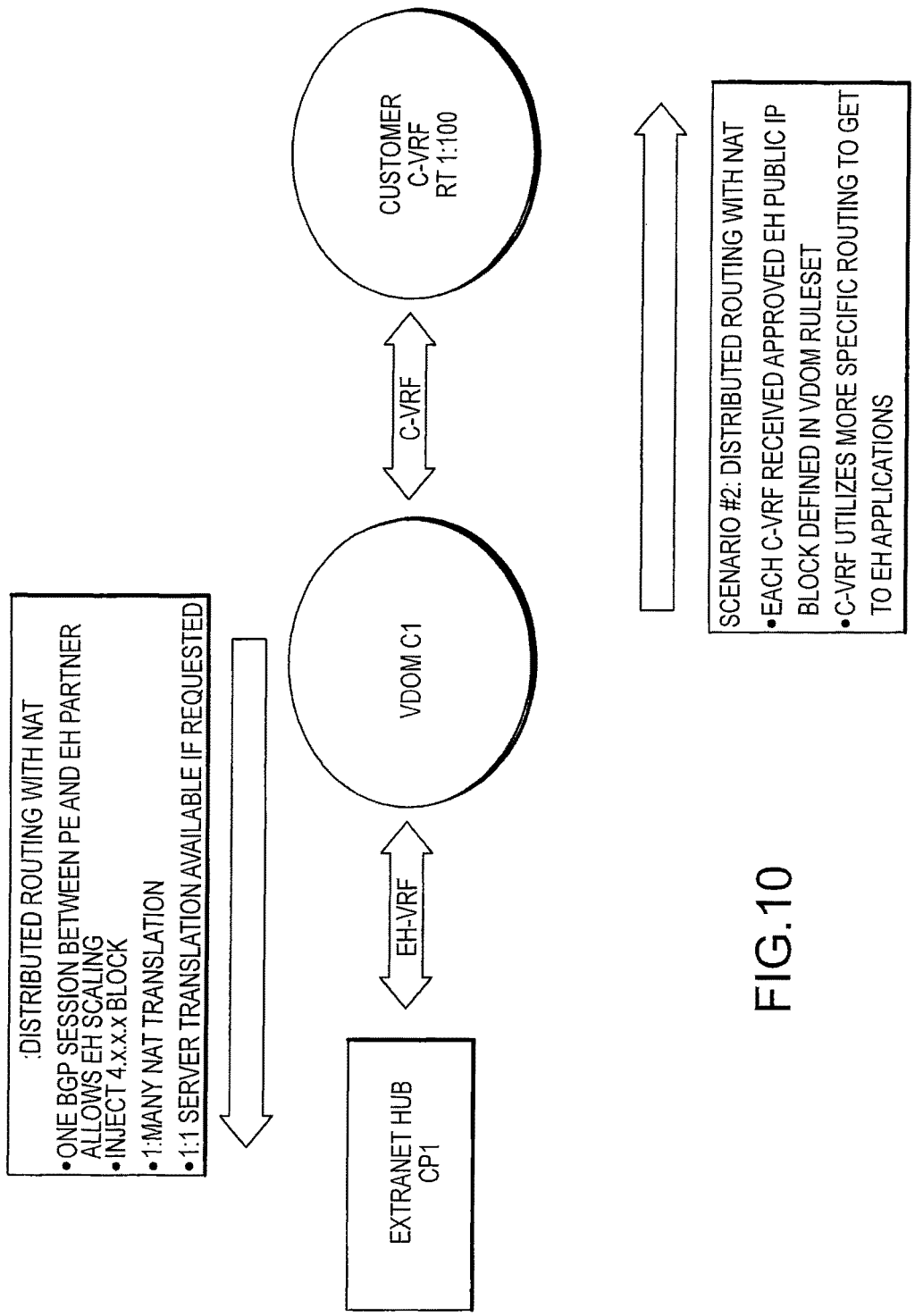
FIG. 10 is a diagram providing further detail of the system set forth in FIG. 9.

FIG. 10 is a system diagram further illustrating the implementation set out in FIG. 9, and particularly illustrating the association of customer and cloud VRF routing in the VDOM established in the PE/NAT 92. The NAT may implement 1:1 translation or 1:many translation.

Figure 11:
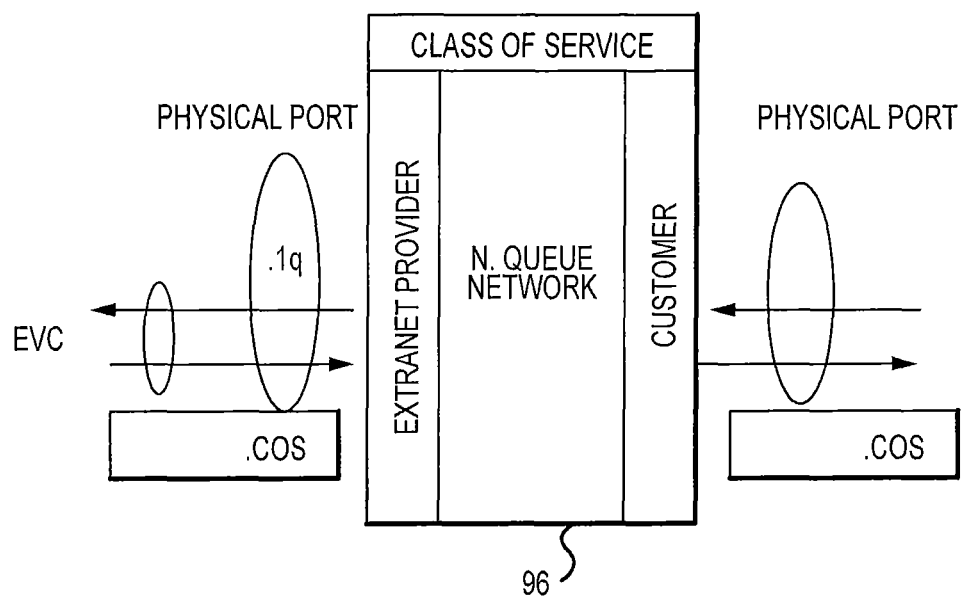
FIG. 11 is diagram illustrating implementation of class of service in the private network between a cloud provider and an enterprise.

FIG. 11 is a diagram illustrating class of service or QOS support within the described systems. In this system, the network provider can manage the customer's indicated class of service. So, for example, if an enterprise is obtaining two types of services from one or more cloud providers, the enterprise can prioritize or otherwise define a class of service for the two services. In this example, the customer may define, such as through the portal, a first high priority to email and a second intermediate priority to voice. The system provides a signature for the different types of services provided. So, for example, the cloud provider may provide a range of IP addresses associated with email and second range of IP addresses associated with voice services. The system then can identify packets from the IP addresses and make routing decisions according to the defined class of service. In another alternative, the cloud provider may include port information for different types of services, and the system may append unique packet header information depending on the port from which the packet is received. The system may then make class of service routing decisions based on the appended packet header information.

A class of service module 96 may be provisioned in the PE router 38 at the cloud hub. The module 96 may be provisioned with a table mapping the various services to the associated class of service. Thus, for example, the table would include a map between email packets and a high class of service and voice packets and intermediate class of service. When packets are received, the module performs a table look-up to extract the class of service, and makes subsequent routing decisions based on the class of service. So, for example, if network bandwidth between the customer and cloud provider has been substantially consumed, the packets with high priority will be processed and transmitted before those packets, which can be queued, are processed and transmitted.

The system can manage or implement various class of service arrangements, including 4q (four different classes of services) and 6q (six different classes of service).

Figure 12:
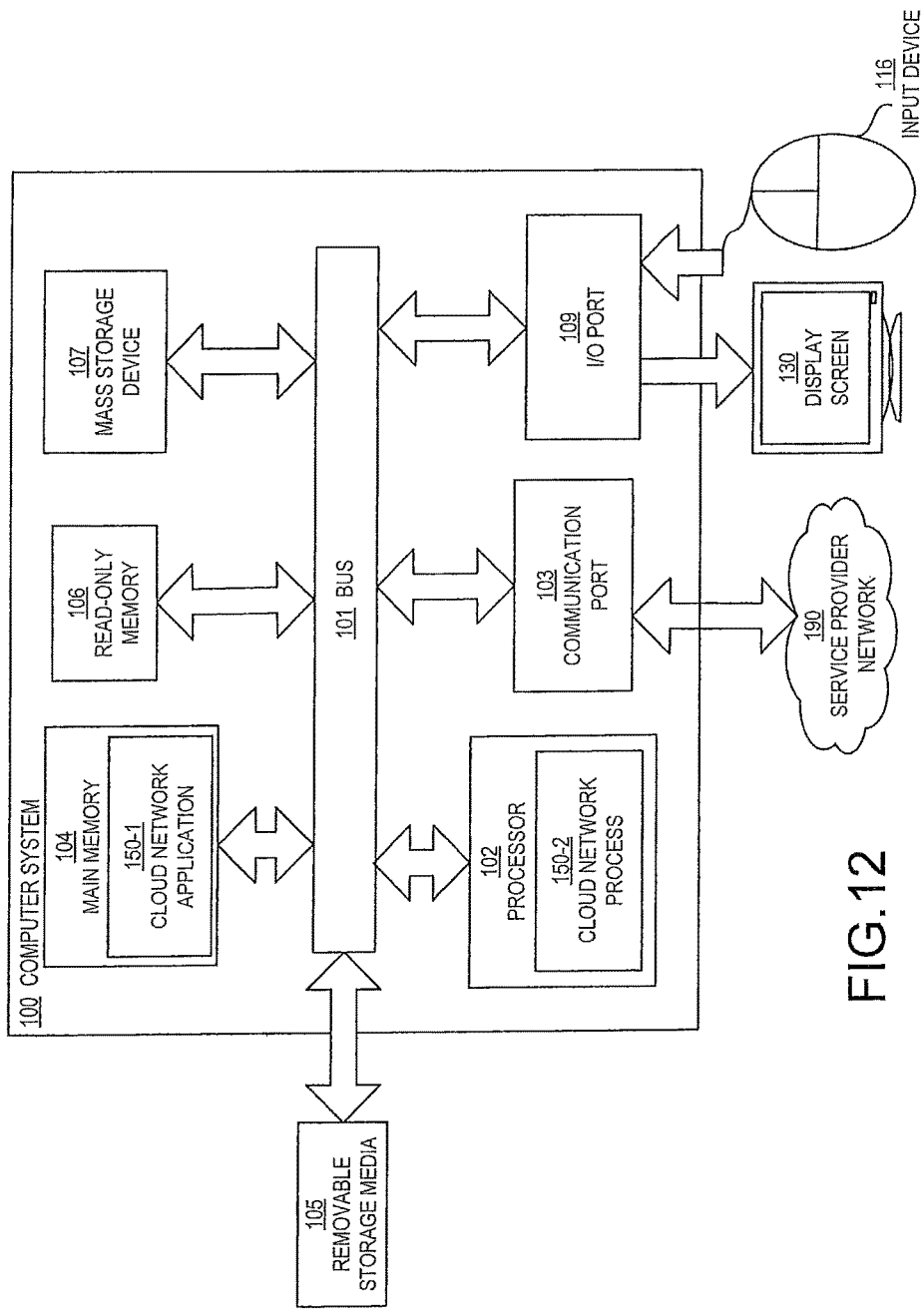
FIG. 12 is a block diagram of a computer system suitable for performing methods and implementing systems in accordance with an example embodiment.

FIG. 12 is a schematic diagram of a computer system 100 upon which embodiments discussed herein may be carried out and implemented.

According to the present example, the computer system 100 includes a bus 101 (i.e., interconnect), at least one processor 102, at least one communications port 103, a main memory 104, a removable storage media 105, a read-only memory 106, and a mass storage 107. Processor(s) 102 can be any known processor, such as, but not limited to, an Intel® Itanium® or Itanium2® processor(s), AMD® Opteron® or Athlon MP® processor(s), or Motorola® lines of processors. Communications ports 103 can be any of an RS-232 port for use with a modem based dial-up connection, a 10/100 Ethernet port, a Gigabit port using copper or fiber, or a USB port. Communications port(s) 103 may be chosen depending on a network such as a Local Area Network (LAN), a Wide Area Network (WAN), service provider network, customer network, cloud service provider network, or any network to which the computer system 100 connects (e.g., service provider network 190). The computer system 100 may be in communication with peripheral devices (e.g., display screen 130, input device 116) via Input/Output (I/O) port 109.

Main memory 104 can be Random Access Memory (RAM), or any other dynamic storage device(s) commonly known in the art. Read-only memory 106 can be any static storage device(s) such as Programmable Read-Only Memory (PROM) chips for storing static information such as instructions for processor 102. Mass storage 107 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 101 communicatively couples processor(s) 102 with the other memory, storage and communications blocks. Bus 101 can be a PCI/PCI-X, SCSI, or Universal Serial Bus (USB) based system bus (or other) depending on the storage devices used. Removable storage media 105 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 104 is encoded with cloud network application 150-1 that supports functionality as discussed above and as discussed further below. Cloud network application 150-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 102 accesses main memory 104 via the use of bus 101 in order to launch, run, execute, interpret or otherwise perform the logic instructions of the cloud network application 150-1. Execution of cloud network application 150-1 produces processing functionality in cloud network process 150-2. In other words, the cloud network process 150-2 represents one or more portions of the cloud network application 150-1 performing within or upon the processor(s) 102 in the computer system 100.

It should be noted that, in addition to the cloud network process 150-2 that carries out method operations as discussed herein, other embodiments herein include the cloud network application 150-1 itself (i.e., the un-executed or non-performing logic instructions and/or data). The cloud network application 150-1 may be stored on a computer readable medium (e.g., a repository) such as a floppy disk, hard disk or in an optical medium. According to other embodiments, the cloud network application 150-1 can also be stored in a memory type system such as in firmware, read only memory (ROM), or, as in this example, as executable code within the main memory 104 (e.g., within Random Access Memory or RAM). For example, cloud network application 150-1 may also be stored in removable storage media 105, read-only memory 106, and/or mass storage device 107.

As discussed herein, embodiments discussed herein include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

FIG. 13 includes a flowchart according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Now, more specifically, FIG. 13 shows a flow chart 200 of processing steps representing processing operations performed by the cloud network process 150 (i.e., cloud network application 150-1 and/or the run-time implementation of cloud network process 150-2) in accordance with one example embodiment.

In step 205, the cloud network process 150 provides virtual private network (VPN) access across a service provider network for each of a plurality of customers of the service provider network.

In step 210, the cloud network process 150 provides private access across the service provider network between at least one of the plurality of customers and at least one of a plurality of cloud service providers associated with the service provider network.

In step 215, the cloud network process 150 implements Virtual Forwarding and Routing (VRF) to enable a secure multi-tenancy environment in the service provider network among the plurality of customers and the plurality of cloud service providers.

In step 220, the cloud network process 150 implements Network Address Translation (NAT) to enable scaling of private access between the plurality of customers and the plurality of cloud service providers across the service provider network.

In step 225, the cloud network process 150 causes an edge router in the service provider network to implement NAT between at least one of the plurality of customers and at least one of the plurality of cloud service providers.

Although the present invention has been described with reference to various embodiments, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A computer-implemented method for providing virtualized cloud services across a service provider network, the computer-implemented method, comprising:
    establishing one or more connections between the service provider network and at least one cloud service provider;
    establishing a first virtual private network (VPN) connection between a first customer network and the service provider network;

establishing a second VPN connection between a second customer network and the service provider network;

providing private access to the at least one cloud service provider for the first customer network using the first VPN and at least one of the one or more connections between the service provider network and the at least one cloud service provider;

providing private access to the at least one cloud service provider for the second customer network using the second VPN and at least one of the one or more connections between the service provider network and the at least one cloud service provider;

implementing Virtual Forwarding and Routing (VRF) to enable a secure multi-tenancy environment in the service provider network among the first customer network, the second customer network, and the at least one cloud service provider;

implementing Network Address Translation (NAT) to enable scaling of private access between the first customer network, the second customer network, and the at least one cloud service provider across the service provider network;

causing an edge router in the service provider network to implement NAT between at least one customer network selected from the group consisting of the first customer network or the second customer network and the at least one cloud service provider;

tagging a first unique identification to data packets being routed from a cloud provider network to a particular customer through a particular VPN of the service provider network; and tagging a second unique identification to data packets being routed from the particular customer through the particular VPN of the service provider network to the cloud provider network;

whereby the data packets being routed from the cloud provider network to the particular customer network, and the data packets being routed from the particular customer network to the cloud provider network are private between the particular customer network and the cloud provider network.

2. The computer-implemented method of claim 1, further comprising:

exporting a plurality of route targets from a cloud provider network configured to provide one or more services of the at least one cloud service provider to a first VRF of at least one first router of the service provider network;

exporting a plurality of route targets from a customer network to a second VRF of at least one second router of the service provider network, the customer network selected from a group consisting of the first customer network and the second customer network;

importing the plurality of route targets from the first VRF at the second VRF; and importing the plurality of route targets from the second VRF at the first VRF.

3. The computer implemented method of claim 2 wherein the at least one second router comprises a plurality of provider edge routers for a corresponding plurality of customer offices of the customer network, each of the plurality of routers including a VRF with the cloud provider network route targets such that the offices have secure private access to at least one service of the one or more services.

4. The computer-implemented method as recited in claim 1, further comprising:

establishing a border gateway protocol (BGP) session between the edge router in the service provider network and a second router of the service provider network, the second router having a physical connection with a cloud provider network of the at least one cloud service provider; and providing the private access between the at least one customer network and the cloud provider network using the BGP session and the physical connection with the cloud provider network.

5. The computer implemented method of claim 4, further comprising:

establishing a plurality of virtual domains unique to each customer network accessing the cloud provider network, the virtual domains at the edge router implementing the NAT of the hub of the cloud provider network.

6. The computer implemented method as recited in claim 1 further comprising implementing class of service routing among packets distributed across the VPN between a particular cloud service provider and a particular customer.

7. A system of providing virtualized connectivity in a cloud services environment, the system including at least one processor and memory that is operatively connected to the at least one processor and further comprising:

a first virtual private network for a first customer network;

a second virtual private network for a second customer network;

at least one established connection to a cloud service provider; and a service provider network providing private access to the cloud service provider for the first customer network and the second customer network, the service provider network comprising an edge router, wherein:

the private access to the cloud service provider for the first customer network is provided via the first virtual private network and the at least one established connection to the cloud service provider; and the private access to the cloud service provider for the second customer network is provided via the second virtual private network and the at least one established connection to the cloud service provider;

the edge router implements network address translation (NAT) between at least one customer network selected from the group consisting of the first customer network or the second customer network and the at least one cloud service provider;

data packets being routed from a cloud provider network to a particular customer through a particular virtual private network of the service provider network are tagged with a first unique identification; and data packets being routed from the particular customer through the particular virtual private network of the service provider network to the cloud provider network are tagged with a second unique identification;

whereby the data packets being routed from the cloud provider network to the particular customer network, and the data packets being routed from the particular customer network to the cloud provider network are private between the particular customer network and the cloud provider network.

8. The system of claim 7, wherein the edge router has at least one physical connection with the cloud service provider, wherein the edge router provides the at least one established connection to the cloud service provider.

9. The system of claim 7, wherein the service provider network implements Virtual Forwarding and Routing (VRF) to enable a secure multi-tenancy environment in the service provider network among at least the first customer network, the second customer network, and the cloud service provider.

10. The system of claim 7, wherein the edge router implements the Network Address Translation (NAT) to enable scaling of the private access to the cloud service provider for the first customer network and the second customer network.

11. A computing system comprising:
at least one processor; and
memory encoding computer executable instructions that, when executed by the at least one processor, perform a method comprising:
  establishing one or more connections between the service provider network and at least one cloud service provider;
  establishing a first virtual private network (VPN) connection between a first customer network and the service provider network;
  establishing a second VPN connection between a second customer network and the service provider network;
  providing private access between the at least one cloud service provider and the first customer network using the first VPN and at least one of the one or more connections between the service provider network and the at least one cloud service provider; and
  providing private access between the at least one cloud service provider and the second customer network using the second VPN and at least one of the one or more connections between the service provider network and the at least one cloud service provider;
  causing an edge router in the service provider network to implement network address translation (NAT) between at least one customer network selected from the group consisting of the first customer network or the second customer network and the at least one cloud service provider;
  tagging a first unique identification to data packets being routed from a cloud provider network to a particular customer through a particular VPN of the service provider network; and
  tagging a second unique identification to data packets being routed from the particular customer through the particular VPN of the service provider network to the cloud provider network;
  whereby the data packets being routed from the cloud provider network to the particular customer network, and the data packets being routed from the particular customer network to the cloud provider network are private between the particular customer network and the cloud provider network.

12. The computing system of claim 11, wherein the method further comprises:
  exporting a plurality of route targets from a cloud provider network configured to provide one or more services of the at least one cloud service provider to a first VRF of at least one first router of the service provider network;
  exporting a plurality of route targets from a customer network to a second VRF of at least one second router of the service provider network, the customer network selected from a group consisting of the first customer network and the second customer network;
  importing the plurality of route targets from the first VRF at the second VRF; and
  importing the plurality of route targets from the second VRF at the first VRF.

13. The computing system of claim 12, wherein the at least one second router comprises a plurality of provider edge routers for a corresponding plurality of customer offices of the customer network, each of the plurality of routers including a VRF with the cloud provider network route targets such that the offices have secure private access to at least one service of the one or more services.

14. The computing system of claim 11, wherein the method further comprises:
  establishing a border gateway protocol (BGP) session between the edge router in the service provider network and a second router of the service provider network, the second router having a physical connection with a cloud provider network of the at least one cloud service provider; and
  providing the private access between the at least one customer network and the cloud provider network using the BGP session and the physical connection with the cloud provider network.

15. The computing system of claim 11, wherein the method further comprises:
  implementing class of service routing among packets distributed across the VPN between a particular cloud service provider and a particular customer network.

* * * * *